Aug. 23, 1938.　　　　C. F. SECHRIST　　　　2,128,015
EGG CASE FILLER
Filed July 25, 1932
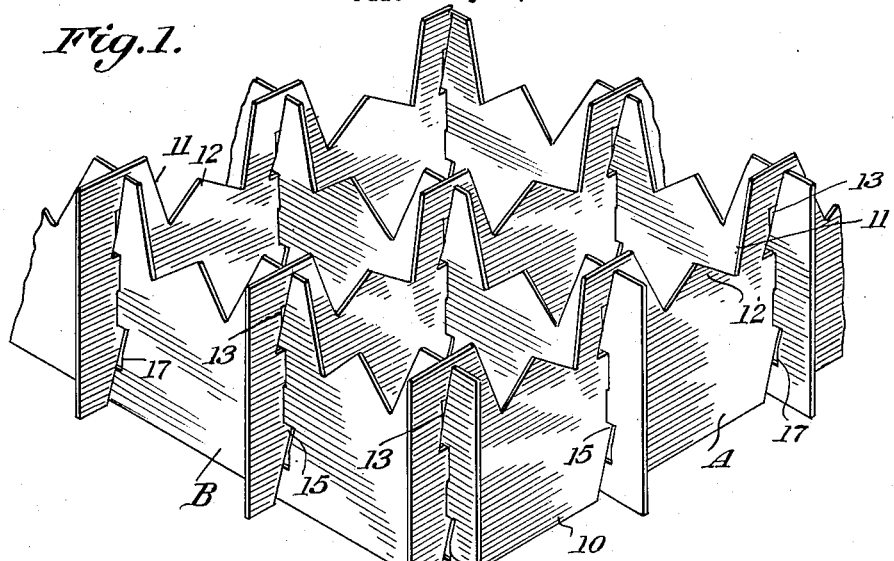
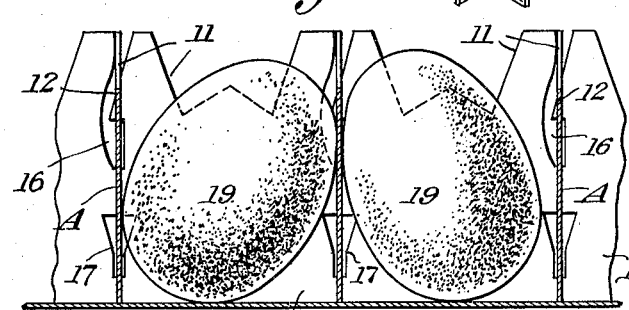
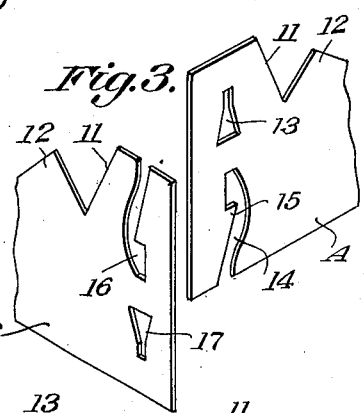
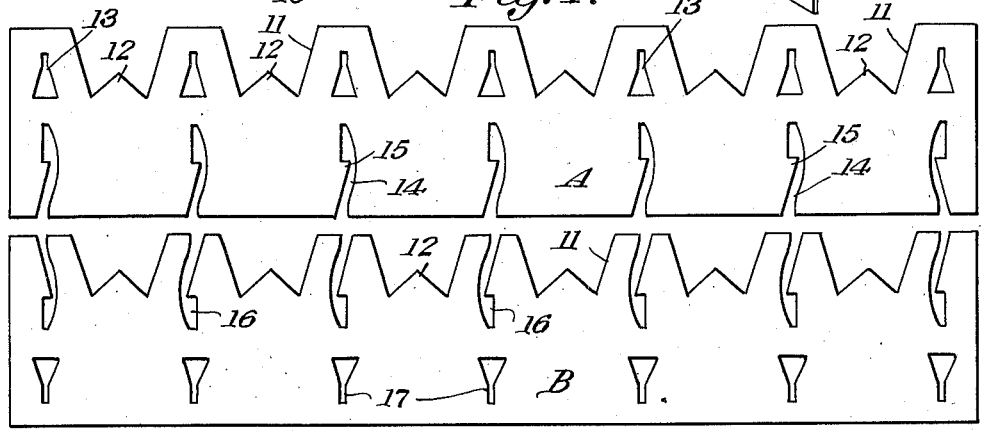
Charles F. Sechrist INVENTOR
BY Victor J. Evans & Co.
ATTORNEYS Patented Aug. 23, 1938

2,128,015

UNITED STATES PATENT OFFICE 2,128,015

EGG CASE FILLER

Charles F. Sechrist, Seattle, Wash.

Application July 25, 1932, Serial No. 624,531

1 Claim. (Cl. 217—34)

The invention relates to an egg case filler.

The primary object of the invention is the provision of a filler of this character, wherein the pockets or cells for eggs are formed through the interfitting of vertical partitions or filler strips disposed in spaced parallel relation to each other and crossing one another, these partitions or filler strips with their cutaway feature being so constructed that the eggs stand high in the filler and thus give a larger view of the eggs to show their quality which has a very good sales value and also it enables a further inspection of the eggs arranged within the pockets or cells, it being unnecessary for the removal of the eggs to determine the condition thereof, that is, whether or not such eggs are broken or soiled.

Another object of the invention is the provision of a filler of this character wherein the filler strips or partitions thereof are cut away in a manner as to protect eggs from coming in contact with each other when nested or placed within the pockets or cells of the filler, especially should the eggs be caused to lean toward a neighbor egg and the latter shift toward the adjacent eggs.

A further object of the invention is the provision of a filler of this character wherein the partitions or filler strips in their interlocked condition will withstand shocks and jars and at the same time will protect eggs confined therein during transit of the same or while handled in a case, crate or the like as the eggs will be prevented from contact with each other during transportation and the handling of the case, crate or the like, while the filler in its set-up condition will be firm and withstand considerable usage.

A still further object of the invention is the provision of a filler of this character wherein the partitions or filler strips are interlocked with each other in the setting up of said filler at several points of the height of the filler, thereby materially strengthening the filler and giving rigidity thereto.

A still further object of the invention is the provision of a filler of this character wherein the simplicity of the curved walls of the slots with their right-angular tongues at the extreme ends of the slots makes the assembling operation of the partitions or strips rapid and accurate and without danger of damage to any of the same, while the shape of the receiving eyes of the slots is such that the tongues readily find their places in the process of intermeshing.

A still further object of the invention is the provision of a filler of this character which is simple in construction, thoroughly reliable and efficient in its purpose, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary perspective view of a filler constructed in accordance with the invention and set up ready for use.

Figure 2 is an enlarged vertical sectional view thereof showing eggs pocketed therein.

Figure 3 is a fragmentary perspective view showing the ends of interfitted partitions or filler strips, detailing the double lock feature thereof.

Figure 4 is a plan view of one filler partition or strip.

Figure 5 is a plan view of the other filler partition or strip.

Similar reference characters indicate corresponding parts throughout the several views in the drawing:

Referring to the drawing in detail, the filler constituting the present invention comprises spaced parallel right-angularly laid or disposed partitions or strips A and B respectively, each formed from a blank of cardboard although the same may be made from any other suitable material. The partitions A and B each includes a body 10 in the form of a strip and the uppermost edge thereof at intervals is cut into to provide downwardly tapered openings 11, the inner closed end of each being formed with a pointed tongue 12, the openings 11 being equidistanced from each other throughout the extent of the body 10. Between the openings 11 in the partitions A are formed the slots 13, these being narrowed in one direction and are midway with respect to said openings 11 and in a row therewith.

In the partitions A and opening through the edges of the bodies 10 thereof opposite to the edges having the openings 11 are curved slots 14, these being vertically aligned with the slots 13 and have formed therein latching lips 15 intermediate of their length, each lip 15 being projected from one wall of said slot 14. The partitions B have the slots 16 corresponding to the slots 14 between the openings 12 and opening through the edges through which said openings 11 open while the slots 17 corresponding to the slots 13 are disposed in the partitions B next to the opposite edges thereof. In other words, the slot formations 13 and 14 in the partitions A are reverse to the slot formations 16 and 17 in the partitions B and in this fashion the said partitions A and B will interlock with each other in their spaced parallel relation and in crossed disposition of the series while a double lock connection is had between the said partitions A and B at the interconnected points thereof and in this manner a secure filler is had when the partitions A and B are set-up and inter-fitted with each other.

The interfitting of the partitions A and B form therebetween pockets or cells 18 for eggs 19 and the turning of the latter will be interrupted by the said partitions of the filler to prevent contact of one egg with the other, while the openings 11 which extend deep with the center tongues 12 therein permit of inspection of the individual eggs held within the pockets or cells 18, the tongues 12 functioning to prevent contact of the eggs when turned toward each other of adjacent eggs so that breakage is avoided and protection is assured to the eggs both during transportation and the handling thereof when packed within a case, crate or the like.

It is to be understood that while there has been heretofore described and illustrated in the accompanying drawing a rather specific construction, this is not to be construed as a limitation to the precise design of the cutaway feature to be used for protection against breakage of the eggs as it is contemplated within the scope of the present invention that any projection having for its purpose protection against breakage of eggs in the filler structure falls within the purview of the said invention. Therefore changes, variations and modifications may be made in the filler structure as may come properly within the scope of the appended claim without departing from the spirit of the invention or sacrificing any of its advantages.

What is claimed is:

A filler of the character described comprising spaced interfitted strip members forming pockets for the reception of eggs, all of said strip members having cut out portions in the upper edge portions thereof located between the interfitting points of said strip members, and tongues projecting upwardly from the bottom of said cut out portions and terminating substantially below the upper edge of the strip member, said cut out portions and said upwardly projecting tongues being of such size as to afford protection of the eggs against breakage while exposing the major top portion of the eggs on all sides thereof.

CHARLES F. SECHRIST.